Aug. 14, 1945.   D. PAPKIN   2,382,811
ADJUSTABLE CLAMP FOR FOOD CHOPPERS OR THE LIKE
Filed Nov. 6, 1943   2 Sheets-Sheet 1

Inventor
David Papkin
By Rockwell & Bartholow
Attorneys

Aug. 14, 1945.  D. PAPKIN  2,382,811
ADJUSTABLE CLAMP FOR FOOD CHOPPERS OR THE LIKE
Filed Nov. 6, 1943  2 Sheets-Sheet 2

Inventor
David Papkin
By Rockwell & Bartholow
Attorneys

Patented Aug. 14, 1945

2,382,811

UNITED STATES PATENT OFFICE 2,382,811

ADJUSTABLE CLAMP FOR FOOD CHOPPERS OR THE LIKE

David Papkin, New Haven, Conn., assignor to Sargent & Company, New Haven, Conn., a corporation of Connecticut Application November 6, 1943, Serial No. 509,301

1 Claim. (Cl. 248—226)

This invention relates to a food chopper and clamp for securing the chopper in place upon a support, and more particularly to means for securing the body of the chopper structure to the clamp whereby the former may be secured to the latter in a plurality of positions upon the body portion of the clamp, the securing means being so arranged that the chopper may occupy a plurality of angular positions with respect to the clamp.

Food choppers for domestic use usually consist of a clamp to secure the article to a support, a pedestal or supporting standard secured to the clamp, and the chopper itself secured to or supported upon the upper portion of the pedestal or standard. Usually the clamp is arranged to be secured to a horizontal supporting surface such as the edge of a table or the like, and when so secured the hopper of the food chopper will be disposed in an upright position with the feed screw in a horizontal position. However, it is sometimes desired to secure the clamp to a vertically disposed support such as to the edge of a sink, for example.

This cannot be done with a chopper of the usual form, for, if the device is clamped to a vertically disposed support the food chopper will not be in the proper position for operation. It is contemplated, therefore, by the present invention to secure the food chopper adjustably to the clamp so that it may be disposed in a plurality of positions with respect to the clamp body, and particularly so that it may stand in a plurality of positions at different angular relations with respect to the clamp body.

One object of the invention is to provide a food chopper and clamp therefor of such construction that the chopper body may be adjustably secured to the clamp to be connected thereto in a plurality of positions.

A further object of the invention is to provide a food chopper and clamp therefor so arranged that the chopper may be secured to the clamp in a plurality of positions so that it may stand in an upright position when the clamp is secured to a horizontally disposed support, as well as when the clamp is secured to a vertically disposed support.

A still further object of the invention is to provide a food chopper and clamp therefor and means for adjustably connecting the food chopper to the clamp whereby the chopper body may be readily moved from one position to another so as to dispose the chopper in upright position regardless of the position of the clamp.

To these and other ends the invention consists in the novel features and combinations of parts to be hereinafter described and claimed.

Figure 1:
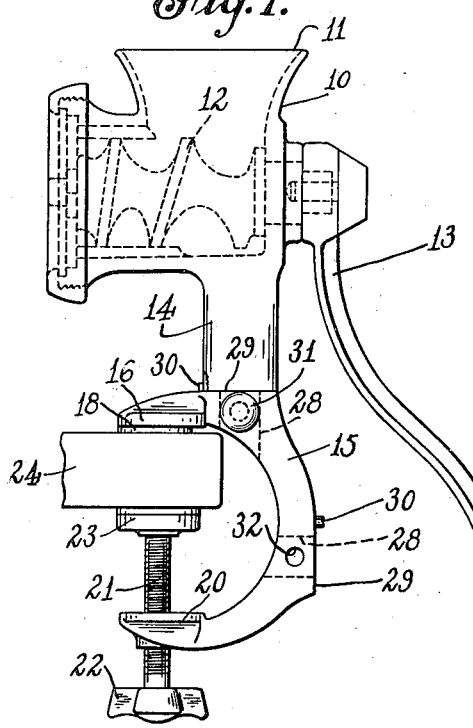
Fig. 1 is a side elevational view of a food chopper and clamp therefor embodying my invention.

To illustrate a preferred embodiment of my invention I have shown in Fig. 1 of the drawings a food chopper of more or less usual form comprising a body portion 10, a hopper 11, and a feed screw 12 rotatably mounted within the body portion, as is usual, the screw being adapted to be rotated by the handle 13. The body of the chopper is in this instance supported upon a standard or pedestal member 14 which extends downwardly, and is provided at its lower end, as will be hereinafter explained, with means by which it may be secured to a clamp.

The clamp portion of the device is designated as a whole by the numeral 15, and comprises a generally C-shaped body portion having bifurcated arms 16 and 17 adjacent one end thereof upon the lower faces of which are clamping pads 18 and 19.

At the other end of the C-shaped body member the clamp is provided with an enlarged end 20 in which is formed a threaded opening to receive a threaded screw 21 operated by a wing nut 22 and provided on its upper end with a cooperating clamping pad 23. As shown in Fig. 1, this clamp cooperates in the usual way with a supporting surface 24, such as a table or the like, to secure the chopper thereupon.

Figure 3:
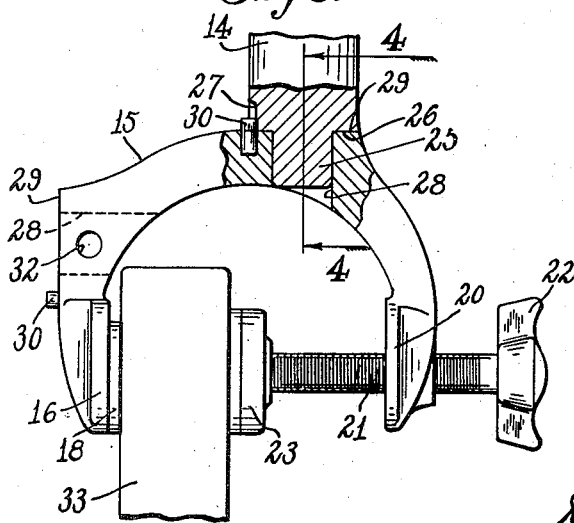
Fig. 3 is a side elevational view of the clamp attached to a vertical support, with the chopper pedestal secured thereto in a position different from that shown in Fig. 1.
Figure 4:
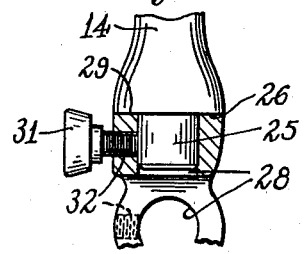
Fig. 4 is a sectional view on line 4—4 of Fig. 3.

As shown more particularly in Figs. 3 and 4, the standard 14 is provided with a reduced lower end portion or stud 25 forming an annular shoulder 26 with the body of the pedestal. It is also provided with a recess 27 at one side thereof adjacent the front of the clamp, for a purpose to be hereinafter explained.

The clamp is provided with a plurality of recesses or socket openings 28, two of these being illustrated in the drawings. Adjacent the edge of each of these sockets the exterior surface of the clamp is substantially flat, as shown at 29, so that when the reduced end or post 25 on the lower end of the standard is received in one of the sockets, the flat shoulder 26 about the post will rest solidly on this flat surface. Also, adjacent each of the sockets 28 is provided an outwardly projecting pin 30 designed to be partially received in the recess 27 and engage with the walls of this recess to prevent rotation of the standard upon the clamp. The standard or pedestal 14 may be secured against accidental removal by means of a set screw 31 received in a threaded opening 32, one of these openings being provided in the walls of each of the sockets 28.

It will be seen, therefore, that when the screw 31 is loosened, the post 25 may be readily withdrawn from the socket in which it has been inserted, and the pedestal 14 and the chopper structure carried thereby may be disconnected from the clamp. When it is desired to connect the two parts, the post 25 is inserted in one or the other of the sockets 28, with the pin 30 entering the recess 27, and upon tightening the screw 31 the chopper structure will be securely fixed to the clamp. As is shown in Fig. 1, the clamp is secured to a horizontally disposed support such as the edge of a table or the like. When the clamp is in this position the pedestal 14 will be secured to the clamp by inserting the post in the socket 25 nearest the upper end of the clamp, so that the pedestal will stand in a vertical position and the chopper will be properly disposed for operation.

Figure 2:
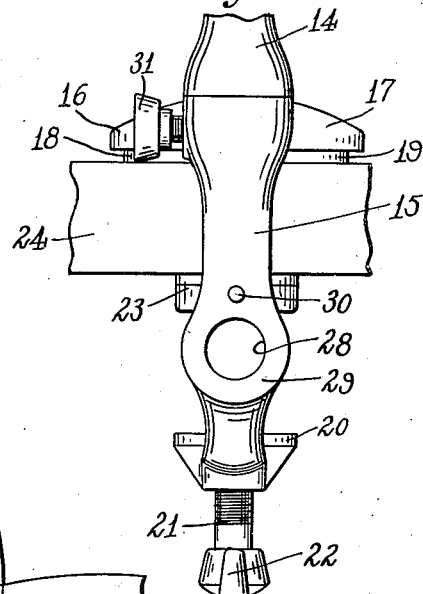
Fig. 2 is a front view of the lower portion of the device, with the handle removed.

If, however, it is desired to secure the clamp to a vertical support, such as shown at 33 in Fig. 2, the screw 31 is released and the pedestal 14 removed from the upper socket 28 and inserted in the lower of the two sockets. It will be seen that in this position the pedestal will likewise be vertically disposed so that the chopper structure will be in the proper position notwithstanding that the angular relation of the body and the clamp has been changed. For example, in Fig. 1 of the drawings the pedestal 14 occupies a position substantially parallel to that of the axis of the screw 21, while in Fig. 3 it occupies a position substantially at right angles to the axis of the screw. It will, of course, be understood that if a greater range of adjustment is desired, as many of the sockets 25 may be provided in the clamp as is necessary.

In Figs. 5 to 8 of the drawings I have shown a modified form of my invention, wherein the pedestal or supporting standard of the food chopper is universally adjustable with respect to the clamp. That is, it may be secured in any position upon the body of the clamp, instead of at certain definite positions, as would be the case with the post and socket arrangement previously described.

In this form of my invention the pedestal 14ª, which supports the food chopper, is bifurcated or split at its lower end, as shown at 35, to provide legs 36 and 37 carrying at their lower ends clamping jaws 38 and 39. A screw 40 is passed through registering openings in the legs 36 and 37, which screw threadedly receives a nut 41 on one end and is provided at the other end with a turning bar 42, so that by the turning of this bar the clamping jaws 38 and 39 may be drawn together or released, as desired. The nut 41 may engage a shoulder 43 on the adjacent leg of the pedestal to hold it against rotation when the bar 42 is turned.

Figure 8:
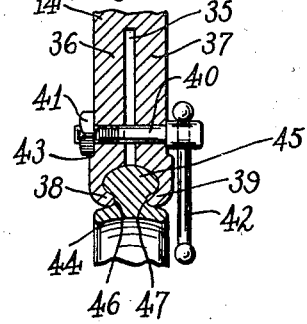
Fig. 8 is a sectional view on line 8—8 of Fig. 7.

The clamp 15ª is of the same generally C-shaped form as shown in Figs. 1 to 4, but the body of the clamp is of a particular cross-sectional shape to cooperate with the clamping jaws 38 and 39. As shown in Fig. 8, the clamp comprises a web portion 44 to which is secured a way or rib 45 connected to the web 44 by a neck portion providing grooves or recesses 46 and 47 in which the lower edges of the clamping jaws 38 and 39 are received.

These recesses 46 and 47 are extended through the edge of the clamp at the lower end thereof, as shown at 48, so that the clamping jaws 38 and 39 may be slipped out of these grooves to remove the pedestal from the clamp or to connect it thereto.

It will be apparent that upon loosening the screw 40 by turning the bar 42, the clamping jaws 38 and 39 may be released from the rib or way 45, and the pedestal 14ª moved about the body of the clamp to any desired position. When the pedestal and chopper are in the desired position the screw may be tightened and will secure the pedestal rigidly to the clamp so that the chopper will be properly supported.

Figure 5:
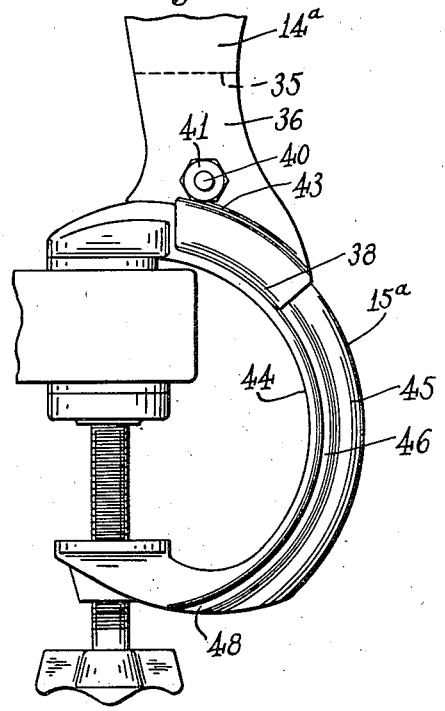
Fig. 5 is a side elevational view of the pedestal of the food chopper and a clamp of modified form.
Figure 6:
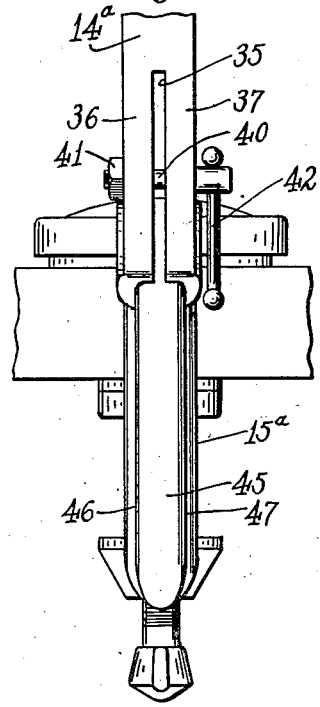
Fig. 6 is a front view of the same.
Figure 7:
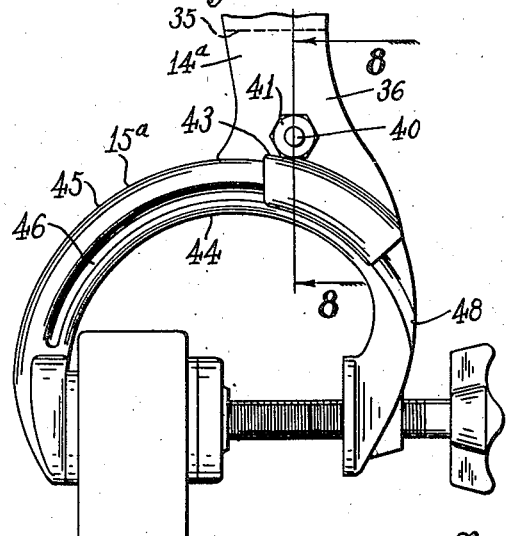
Fig. 7 is a view similar to Fig. 6 but showing the clamp secured upon a vertically disposed support and the chopper pedestal secured thereto in a position different from that shown in Fig. 5.

In Fig. 5 of the drawings I have shown the pedestal in the position on the clamp which it would normally occupy when the chopper is secured to a horizontal support, while in Fig. 7 of the drawings I have shown the pedestal in an adjusted position which it would normally occupy when the chopper is secured upon a vertically disposed support. It will be understood, of course, that the pedestal may be secured to the clamp in any other desired position along the body of the clamp.

While I have shown and described some preferred embodiments of my invention, it will be understood that it is not to be limited to all of the details shown, but is capable of modification and variation within the spirit of the invention and within the scope of the claim.

What I claim is:

A clamp member for a food chopper having a casing, a supporting pedestal therefor, and a feed screw rotatably mounted in the casing, said clamp having a C-shaped body portion to embrace a support, a clamping screw extending through one end of said portion, means for securing said pedestal to said clamp in a plurality of positions, said means comprising a projecting rib provided on the outer surface of the clamp, clamping means on the lower end of the pedestal to embrace said rib, and means for securing said clamping means upon the rib.

DAVID PAPKIN.